UNITED STATES PATENT OFFICE.

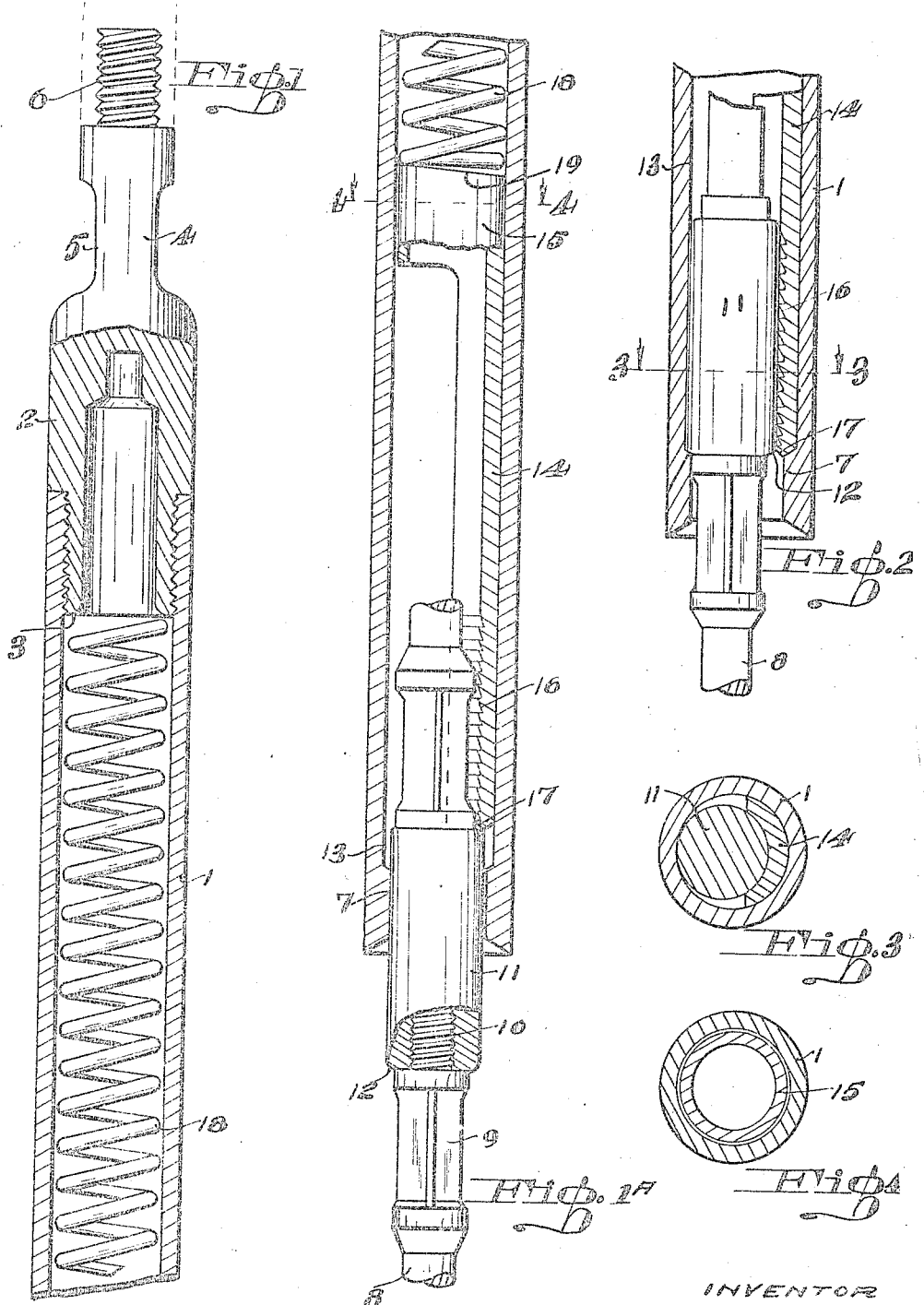

FREDERICK M. BRAMBLEY, OF BREA, CALIFORNIA.

FISHING-TOOL.

1,384,988.

Specification of Letters Patent.   Patented July 19, 1921.

Application filed March 30, 1920. Serial No. 369,843.

*To all whom it may concern:*

Be it known that I, FREDERICK M. BRAMBLEY, a citizen of the United States, residing at Brea, in the county of Orange and State of California, have invented new and useful Improvements in Fishing-Tools, of which the following is a specification.

This invention relates to sucker rod fishing tools, and has for its object the provision of a tool which will be positive and effective in its action, and one in which the sucker rod, when engaged by the fishing tool, is supported from the main tubing thereof, and not simply by a movable slip or clamping member therein.

Further objects of the invention will be readily understood from the following description of the accompanying drawings in which:

Figure 1 is a longitudinal section through the upper portion of a fishing tool socket constructed in accordance with my invention.

Fig. 1A is a similar view taken through the lower portion of the socket showing a broken sucker rod about to be engaged by the socket.

Fig. 2 is a similar view through the lower portion of the socket showing a sucker rod engaged by the same.

Fig. 3 is a transverse section taken on line 3—3 of Fig. 2.

Fig. 4 is a transverse section taken on the line 4—4 of Fig. 1A.

Referring to the accompanying drawings, the socket is shown comprising a hollow tubing 1 threaded at its upper end to engage a stem 2 which forms an annular shoulder 3 within the tubing 1 at its upper end. The stem 2 may be provided with the usual extension 4 forming the wrench seat 5 and the attaching pin 6 at the upper end thereof.

The hollow tubing 1 may be of any desired length and is preferably of the same interior diameter throughout its length. At its lower end it is provided with an inwardly projecting annular ledge 7 forming an aperture of reduced diameter just sufficient to permit the entrance therethrough of the coupling collar of a sucker rod. A sucker rod adapted to be engaged by the fishing tool socket is shown in the drawing as comprising the rod sections 8 squared at their ends to form the wrench seats 9 and terminating in threaded pins 10. Adjacent sections of the sucker rod are united by the usual coupling collar 11 hereinafter referred to as coupling 11 internally threaded at its respective ends to engage the pins 10. This coupling collar is of slightly greater diameter than the sucker rod sections so that an annular shoulder 12 is formed at the junction of the coupling collar with the sucker rod section.

As previously stated, the parts are so arranged that the coupling collars of a sucker rod will just freely slide through the opening in the end of the fishing tool socket formed by the annular ledge 7. After the fishing tool socket has been lowered over a sucker rod which it is desired to remove from a pipe and the coupling 11 of the sucker rod has moved past the ledge 7 of the socket end and with a portion of a rod section which is of reduced diameter opposite the annular ledge 7, the sucker rod is free for limited lateral movement within the hollow tubing of the socket to bring the shoulder 12 formed on the sucker rod over the internal annular lip 13 formed within the hollow tubing at the upper edge of the ledge 7.

By forcing the sucker rod laterally within the hollow tubing of the socket after the coupling 11 has passed ledge 7 and retaining the sucker rod in such position with shoulder 12 thereof resting upon lip 13 said sucker rod will be positively and effectively engaged by the tubing of the socket so that it may be removed from the drillhole with the fishing tool.

The means employed for thus forcing the sucker rod to one side within tubing 1 consists of an elongated clamp or slip 14 yieldably urged downwardly between the wall of tubing 1 and the coupling 11 of the sucker rod. The slip 14 may consist of a head in the form of a ring 15 slidable within the tubing 1 and having the main portion of the slip extending downwardly from one side thereof in the form of an elongated curved strip. The outside curvature of the strip conforms approximately to the curve of the wall of tubing 1, as is shown in Fig. 3, and the curvature of the inner surface of said strip is preferably an arc of a circle described by the coupling 11 when it has been moved laterally eccentric to the tubing 1 with its shoulder 12 engaged by lip 13. By this arrangement it will be seen that the slip 14 fits snugly within the tubing 1, and when it is in operative position for retaining the sucker rod within the tubing, its inner curved surface will contact against collar 11 of the sucker rod throughout the width of the slip, thus providing a maximum contacting gripping surface between the slip and the coupling of the sucker rod.

The surface of the slip 14 which engages the coupling of the sucker rod may be transversely toothed or serrated as shown at 16 to form a more positive gripping engagement between the slip and the coupling. The surface of slip 14 which engages coupling 11 is tapered at the lower edge of the slip as shown at 17 so that when the slip impinges against said coupling 11 the tapered surface 17 will aid in initially moving the coupling 11 away from the slip 14 and toward the opposite side of the tubing.

A coiled spring 18 is interposed between the head 15 of the slip and the shoulder 3 formed at the upper end of tubing 1, this spring being of such strength as to yield and permit upward movement of the slip 14 when the tubing 1 is being lowered over a sucker rod. As soon as the tubing has been lowered a sufficient distance however so that the coupling 11 is past the ledge 7 and the rod is therefore free to move laterally within the tubing, the force of spring 18 will project slip 14 downwardly between the sucker rod and the wall of the tubing, forcing the rod to one side so that its shoulder 12 is engaged by lip 13 for retaining the sucker rod within the tubing as previously described.

The slip 14 is adapted to be urged against the wall of the tubing thereby permitting the slip to be received between the wall of the tubing and the sucker rod. For this purpose the upper surface 19 of the head 15 of the slip which abuts against the lower end of spring 18 is inclined downwardly toward the side of the head from which the slip proper depends. The force of spring 18 against the head of the slip will therefore be greatest at a point diametrically opposite the side from which the slip proper depends and the force exerted by the spring upon the head of the slip will accordingly produce a twisting action tending to urge the slip proper against the wall of the tubing.

By the construction thus described it will be seen that when the coupling of a sucker rod has entered the tubing of the fishing tool socket said rod will be moved laterally eccentric to the tubing until the coupling of the rod impinges against the wall of the tubing and the shoulder formed by the coupling between the rod sections rests upon the lip at the lower end of the socket and said sucker rod being firmly held in this position by the slip that is forced into position between said rod and the wall of the tubing.

It will be evident that various changes in the combinations, constructions and arrangements of parts herein described may be resorted to without departing from the spirit and scope of my invention.

What is claimed is:

1. In a fishing tool for rods having annular shoulders formed thereon, a hollow tubing provided with an inwardly extending lip, said tubing arranged to be positioned over the rod with said lip below a shoulder of said rod; a slip within said tubing and adapted to move downwardly between said rod and said tubing for laterally moving said rod eccentrically to said tubing until its shoulder rests upon the lip of said tubing for retaining said rod within said tubing, the surface of said slip next to said rod conforming to the curvature of said rod when the latter is in retained eccentric position, the top surface of which slip is inclined downwardly toward that portion of the body of the slip that contacts with the inner surface of the tubing; and a compression spring bearing on said inclined top surface.

2. In a fishing tool for rods having annular shoulders formed thereon, a hollow tubing provided with an inwardly extending lip, said tubing arranged to be positioned over the rod with said lip below a shoulder of said rod; a slip within said tubing yieldably urged downwardly between said rod and said tubing for laterally moving said rod eccentrically to said tubing until its shoulder rests upon the lip of said tubing for retaining said rod within said tubing; said slip having its inner and outer surfaces eccentrically curved, the outer surface of the slip conforming to the curvature of said tubing, and the inner surface thereof conforming to the curvature of said rod when the latter is in retained position, the top surface of said slip being inclined downwardly toward the outer surface of the slip that contacts with the body of the tubing; and a compression spring bearing against said inclined top surface.

3. In a fishing tool, a hollow tubing arranged to be lowered over a rod to be engaged by said tube; a slip within said tubing comprising a head and a depending extension at one side thereof; and a spring in said tubing above the slip arranged to engage the head of said slip for yieldably urging the latter downwardly between said rod and said tubing; the surface of said head engaged by said spring sloping downwardly toward the side of said slip carrying said depending extension so that said spring engaging said head will tend to force the depending extension outwardly against the side of said tubing.

In testimony whereof I have signed my name to this specification.

FREDERICK M. BRAMBLEY.